United States Patent
Sivaraj et al.

(10) Patent No.: US 12,526,707 B2
(45) Date of Patent: Jan. 13, 2026

(54) METHOD AND APPARATUS FOR GENERIC ENCODING OF CONFIGURABLE RAN PARAMETERS OVER E2AP MESSAGES

(71) Applicant: Mavenir Networks, Inc., Richardson, TX (US)

(72) Inventors: Rajarajan Sivaraj, Plano, TX (US); Peter McCann, Bridgewater, NJ (US)

(73) Assignee: Mavenir Networks, Inc., Richardson, TX (US)

( * ) Notice: Subject to any disclaimer, the term of this patent is extended or adjusted under 35 U.S.C. 154(b) by 753 days.

(21) Appl. No.: 17/881,972

(22) Filed: Aug. 5, 2022

(65) Prior Publication Data

US 2023/0055590 A1    Feb. 23, 2023

Related U.S. Application Data

(60) Provisional application No. 63/232,979, filed on Aug. 13, 2021.

(51) Int. Cl.
*H04W 28/02* (2009.01)
*H04L 69/06* (2022.01)
(Continued)

(52) U.S. Cl.
CPC ......... *H04W 36/0066* (2013.01); *H04L 69/06* (2013.01); *H04W 24/02* (2013.01);
(Continued)

(58) Field of Classification Search
CPC ......... H04W 28/0205; H04W 28/0967; H04W 28/02; H04W 28/0236; H04W 28/04;
(Continued)

(56) References Cited

U.S. PATENT DOCUMENTS

2022/0014963 A1 *   1/2022  Yeh .................. G06N 3/045
2023/0110387 A1 *   4/2023  Urie .................. H04W 8/186
                                                    455/418

FOREIGN PATENT DOCUMENTS

EP          2640018 A1      9/2013

OTHER PUBLICATIONS

O-RAN Alliance, "O-RAN Working Group 3, Near-Real-time Ra N Intelligent Controller, E2 Application Protocol (E2AP)", O-Ran Alliance, 2020 (Year: 2020).*

(Continued)

*Primary Examiner* — Omer S Mian
(74) *Attorney, Agent, or Firm* — Ruggiero McAllister & McMahon LLC

(57) ABSTRACT

A method of generic encoding of a radio access network (RAN) parameter exchanged over E2 application protocol (E2AP) between an Open Radio Access Network (O-RAN) node and a near-real time radio access network intelligent controller (near-RT RIC) includes: providing a generic encoding mechanism for a message structure containing at least one RAN parameter, wherein the generic encoding mechanism includes a first categorization of each RAN parameter exchanged between the O-RAN node and the near-RT RIC into one of ELEMENT type, STRUCTURE type or LIST type; wherein the ELEMENT type parameter is a singleton variable which does not have any other associated RAN parameter; the STRUCTURE type parameter is a sequence of RAN parameters in which each RAN parameter in the sequence can be one of the ELEMENT type parameter, another STRUCTURE type parameter, or the LIST type parameter; and the LIST type parameter is a list of STRUCTURE type parameters.

13 Claims, 5 Drawing Sheets

| IE/Group Name | Presence | Range | IE type and reference | Semantics description |
|---|---|---|---|---|
| CHOICE RAN Parameter Value Type | M | | | A RAN Parameter can either be an ELEMENT or a STRUCTURE or a LIST |
| >ELEMENT | | | | If the RAN parameter is singular variable |
| >>Key Flag | O | | BOOLEAN | Whether the parameter is a key, indexing other parameters in a structure or not. |
| >>RAN Parameter Value | M | | ENUMERATED (INTEGER, REAL, OCTET STRING, PrintableString,....) | |
| >STRUCTURE | | | | If the RAN parameter is a structure, in turn containing a set of RAN parameters |
| >>RAN Parameter Structure | M | | 3.3.1.2 | |
| >LIST | | | | If the RAN parameter is a list containing individual items, each of which has an index |
| >>RAN Parameter List | M | | 3.3.1.3 | |

(51) Int. Cl.
  *H04W 24/02*    (2009.01)
  *H04W 28/04*    (2009.01)
  *H04W 28/06*    (2009.01)
  *H04W 28/08*    (2023.01)
  *H04W 36/00*    (2009.01)
  *H04W 88/08*    (2009.01)
  *H04B 7/0426*   (2017.01)

(52) U.S. Cl.
  CPC ....... *H04W 28/02* (2013.01); *H04W 28/0205* (2013.01); *H04W 28/0236* (2013.01); *H04W 28/04* (2013.01); *H04W 28/06* (2013.01); *H04W 28/0967* (2020.05); *H04W 36/0027* (2013.01); *H04W 36/0064* (2023.05); *H04W 88/085* (2013.01); *H04B 7/043* (2013.01)

(58) Field of Classification Search
  CPC .......... H04W 36/0064; H04W 36/0066; H04B 7/043; H04L 69/06
  See application file for complete search history.

(56) References Cited

OTHER PUBLICATIONS

Extended European Search Report for corresponding European patent application EP22190187.9, 8 pages, dated Dec. 12, 2022.
ORAN Alliance Working Group 3 E2AP v. 01.01 "ORAN Working Group 3, Near Real Time RAN Intelligent Controller, E2 Application Protocol (E2AP)", Jul. 15, 2020; ORAN Alliance.

* cited by examiner

| RAN Parameters | CATEGORY |
|---|---|
| 1>Target Cell Global ID | STRUCTURE |
| 2>CHOICE *Target Cell* | STRUCTURE |
| 3>*NR* | STRUCTURE |
| 4>PLMN Identity | ELEMENT |
| 4>NR Cell Identity | ELEMENT |
| 3>*E-UTRA* | STRUCTURE |
| 4>PLMN Identity | ELEMENT |
| 4>E-UTRA Cell Identity | ELEMENT |
| 1>List of PDU sessions for Handover | LIST |
| 2>PDU session Item for Handover | STRUCTURE |
| 3>PDU Session ID | ELEMENT |
| 3>List of QoS flows in the PDU session | LIST |
| 4>QoS flow Item | STRUCTURE |
| 5>QoS flow identifier | ELEMENT |
| 1>List of DRBs for Handover | LIST |
| 2>DRB Item for Handover | STRUCTURE |
| 3>DRB ID | ELEMENT |
| 3>List of QoS flows in the DRB | LIST |
| 4>QoS flow Item | STRUCTURE |
| 5>QoS flow Identifier | ELEMENT |
| 1>List of secondary cells to be setup | LIST |
| 2>Secondary cell Item | STRUCTURE |
| 3>Secondary cell ID | STRUCTURE |
| 4>PLMN Identity | ELEMENT |
| 4>NR Cell Identity | ELEMENT |

FIG. 2

| RAN Parameters | CATEGORY | KEY FLAG |
|---|---|---|
| 1>Target Cell Global ID | STRUCTURE | |
| 2><CHOICE Target Cell | STRUCTURE | |
| 3>NR | STRUCTURE | |
| 4>PLMN Identity | ELEMENT | FALSE |
| 4>NR Cell Identity | ELEMENT | FALSE |
| 3>E-UTRA | STRUCTURE | |
| 4>PLMN Identity | ELEMENT | FALSE |
| 4>E-UTRA Cell Identity | ELEMENT | FALSE |
| 1>List of PDU sessions for Handover | LIST | |
| 2>PDU session Item for Handover | STRUCTURE | |
| 3>PDU Session ID | ELEMENT | TRUE |
| 3>List of QoS flows in the PDU session | LIST | |
| 4>QoS flow Item | STRUCTURE | |
| 5>QoS flow Identifier | ELEMENT | TRUE |
| 1>List of DRBs for Handover | LIST | |
| 2>DRB Item for Handover | STRUCTURE | |
| 3>DRB ID | ELEMENT | TRUE |
| 3>List of QoS flows in the DRB | LIST | |
| 4>QoS flow Item | STRUCTURE | |
| 5>QoS flow Identifier | ELEMENT | TRUE |
| 1>List of secondary cells to be setup | LIST | |
| 2>Secondary cell Item | STRUCTURE | |
| 3>Secondary cell ID | STRUCTURE | |
| 4>PLMN Identity | ELEMENT | FALSE |
| 4>NR Cell Identity | ELEMENT | FALSE |

FIG. 3

| IE/Group Name | Presence | Range | IE type and reference | Semantics description |
|---|---|---|---|---|
| CHOICE RAN Parameter Value Type | M | | | A RAN Parameter can either be an ELEMENT or a STRUCTURE or a LIST |
| >ELEMENT | | | | If the RAN parameter is singular variable |
| >>Key Flag | O | | BOOLEAN | Whether the parameter is a key, indexing other parameters in a structure or not. |
| >>RAN Parameter Value | M | | ENUMERATED (INTEGER, REAL, OCTET STRING, PrintableString,...) | |
| >STRUCTURE | M | | 3.3.1.2 | If the RAN parameter is a structure, in turn containing a set of RAN parameters |
| >>RAN Parameter Structure | M | | | |
| >LIST | M | | | If the RAN parameter is a list containing individual items, each of which has an index |
| >>RAN Parameter List | | | 3.3.1.3 | |

FIG. 4

| IE Name | Value type/Value | Semantics Description |
|---|---|---|
| List of RAN parameters | LIST: 2 ITEMS | |
| 1>Item 0 | | |
| 2>RAN Parameter ID | INTEGER | Target Primary Cell ID |
| 2>RAN Parameter Value Type | STRUCTURE | Target Cell |
| 3>Sequence of RAN Parameters | | |
| 4>RAN Parameter ID | INTEGER | |
| 4>RAN Parameter Value Type | STRUCTURE | |
| 5>Sequence of RAN Parameters | | |
| 6>RAN Parameter ID | INTEGER | NR Cell |
| 6>RAN Parameter Value Type | STRUCTURE | |
| 7>Sequence of RAN Parameters | | |
| 8>RAN Parameter ID | INTEGER | NR CGI |
| 8>RAN Parameter Value Type | STRUCTURE | |
| 9>Sequence of RAN Parameters | | |
| 10>RAN Parameter ID | INTEGER | PLMN Identity |
| 10>RAN Parameter Value Type | ELEMENT | |
| 11>Key Flag | FALSE | |
| 11>RAN Parameter Value | xyz | |
| 10>RAN Parameter ID | INTEGER | NR Cell Identity |
| 10>RAN Parameter Value Type | ELEMENT | |
| 11>Key Flag | FALSE | |
| 11>RAN Parameter Value | 123 | |
| 2>RAN Parameter ID | INTEGER | List of DRBs for handover |
| 2>RAN Parameter Value Type | LIST: 2 items | |
| 3>Item 0 | | |
| 4>RAN Parameter ID | INTEGER | DRB item for handover |
| 4>RAN Parameter Value Type | STRUCTURE | |
| 5>Sequence of RAN Parameters | | |
| 6>RAN Parameter ID | INTEGER | DRB ID |
| 6>RAN Parameter Value Type | ELEMENT | |
| 7>Key Flag | TRUE | |
| 7>RAN Parameter Value | 10 | Value (as given in the above scenario for DRB 1) |
| 3>Item 1 | | |
| 4>RAN Parameter ID | INTEGER | DRB Item for handover |
| 4>RAN Parameter Value Type | STRUCTURE | |
| 5>Sequence of RAN Parameters | | |
| 6>RAN Parameter ID | INTEGER | DRB ID |
| 6>RAN Parameter Value Type | ELEMENT | |
| 7>Key Flag | TRUE | |
| 7>RAN Parameter Value | 20 | Value (as given in the above scenario for DRB 2) |

FIG. 5

METHOD AND APPARATUS FOR GENERIC ENCODING OF CONFIGURABLE RAN PARAMETERS OVER E2AP MESSAGES

CROSS-REFERENCE TO RELATED APPLICATIONS

The present application claims the benefit of U.S. Provisional Patent Application No. 63/232,979, filed on Aug. 13, 2021, which is incorporated by reference herein in its entirety.

BACKGROUND OF THE DISCLOSURE

1. Field of the Disclosure

The present disclosure relates to the Open Radio Access Network (O-RAN), and relates more particularly to encoding of configurable RAN parameters exchanged over E2 application protocol (E2AP) messages between the O-RAN nodes and the near-real time (near-RT) RAN Intelligent Controller (RIC) exchanged via the E2 interface.

2. Description of the Related Art

The E2 Service Model-RAN Control (E2SM-RC) defines the different types of services provided by the RIC and the contents of the E2AP messages availing the service. The E2SM-RC service model enables the RIC to control the functionalities and the related procedures of the RAN on a per-UE basis for a variety of O-RAN use-cases, e.g., traffic steering, Quality of Service (QoS), Quality of Experience (QoE), Multiple Input Multiple Output (MIMO) beamforming, slicing, scheduler optimization, vehicle-to-everything (V2X) communication, etc. In the process, the RIC controls several RAN parameters associated with these procedures.

Let's assume an example scenario in which the near-RT RIC wants to control the connected mode mobility of a UE by (i) modifying the 5G New Radio (NR) primary cell of the UE, (ii) reselecting the secondary cells of the UE, (iii) selecting the list of Protocol Data Unit (PDU) sessions for handover in the case of Xn or inter-Radio Access Technology (inter-RAT) or Next Generation (NG) handover, and (iv) selecting the list of Data Radio Bearers (DRBs) for handover in the case of intra-Centralized Unit (intra-CU) F1-interface handover. In this example case, traditional encoding used for facilitating the above-described control service from the RIC works on the principle of defining individual message structures (or set of message structures) along with enumerating a list of associated RAN parameters for each functionality. For example, the message structure for the control service used by the RIC for the connected mode mobility functionality discussed above includes the following parameters: (i) target primary cell, (ii) list of secondary cells to be modified, (iii) the list of PDU sessions for handover, and (iv) the list of DRBs for handover, etc.

In traditional encoding, the RAN parameters need to be defined in each message structure or in separate message structures whose reference(s) are included in this main message structure. For example, the list of associated RAN parameters is defined as follows:

```
1 > Target Cell Global ID
  2 > CHOICE Target Cell
    3 > NR
      4 > PLMN Identity
```

-continued

```
      4 > NR Cell Identity
    3 > E-UTRA
      4 > PLMN Identity
      4 > E-UTRA Cell Identity
1 > List of PDU sessions for Handover
  2 > PDU session Item for Handover
    3 > PDU Session ID
    3 > List of QoS flows in the PDU session
      4 > QoS flow Item
        5 > QoS flow Identifier
1 > List of DRBs for Handover
  2 > DRB Item for Handover
    3 > DRB ID
    3 > List of QoS flows in the DRB
      4 > QoS flow Item
        5 > QoS flow Identifier
1 > List of secondary cells to be setup
  2 > Secondary cell Item
    3 > Secondary cell ID
      4 > PLMN Identity
      4 > NR Cell Identity
```

Each parameter is associated with a "presence" field, that takes one of the following values: "mandatory", "optional" or "conditional". The range and the type of the parameter are also defined, along with the reference and a semantics description. Each parameter is also associated with an assigned criticality, which can take the value as either reject or ignore. In addition, an encoding space (e.g., Abstract Syntax Notation One (ASN.1)) is defined for each RAN parameter controlled by the RIC.

There are several disadvantages of the above-described traditional encoding. One major disadvantage is the need to re-define and re-enumerate a whole new set of control message structures for controlling information elements (IEs) that are already defined in 3GPP standard procedures and message structures in 3GPP technical specifications, i.e., this is akin to re-inventing the wheel. Another disadvantage is the need to remap "freshly-enumerated control structures" and IEs to control actions and procedures associated with RAN functionalities, which is a redundant exercise, given that it is exhaustively covered in 3GPP standards using defined control message structures, comprised of individual IEs that pertain to the required control actions. Yet another disadvantage is the need to re-enumerate fresh encoding spaces (e.g., ASN.1) already defined in 3GPP for all the procedures, message structures and the associated IEs, once again requiring a laborious, expensive, and redundant task. Still yet another disadvantage is the need to redo an exhaustive exercise of categorizing which IEs should be mandatory, optional, or conditional for every control message, which requires altering the choice of IEs from the ones used for the corresponding parameters in 3GPP specifications.

Therefore, there is a need for a common message structure for generic encoding of RAN parameters to be exchanged between the E2 nodes and the near-RT RIC via E2AP messages.

SUMMARY OF THE DISCLOSURE

According to an example embodiment of the present disclosure, a novel technique is provided for the generic encoding of all RAN parameters exchanged over E2AP between the O-RAN nodes and the near-RT RIC for configuration by the near-RT RIC.

According to an example embodiment of the present disclosure, a common message structure is provided for exchanging any number of RAN parameters over E2AP messages between the E2 node and the near-RT RIC.

According to an example embodiment of the present disclosure, using the common message structure and generic encoding, any RAN parameter within any level of nesting in hierarchical structures can be recursively encoded in the common message structure for E2AP messages between the E2 node and the near-RT RIC.

According to an example embodiment of the present disclosure, using the common message structure and generic encoding avoids the need to define individual message structures and enumerate RAN parameters for each message structure for controlling each corresponding RAN functionality.

According to an example embodiment of the present disclosure, E2SM RAN Control can be used as a generic service model for controlling a variety of RAN functionalities corresponding to a plethora of O-RAN use-cases.

BRIEF DESCRIPTION OF THE FIGURES

FIG. 2 is a table showing the listing of the RAN parameters and the associated categories for the example method.

FIG. 3 is a table showing the example list of RAN parameters, along with associated category and the Boolean key flag.

FIG. 4 is a table showing the generic encoding of RAN parameters based on their categorization of the RAN parameters into ELEMENT, STRUCTURE and LIST categories, FIG. 5 is a table showing an example of the contents of the RIC Control Header IE and the RIC Control Message IE.

DETAILED DESCRIPTION

Figure 1:
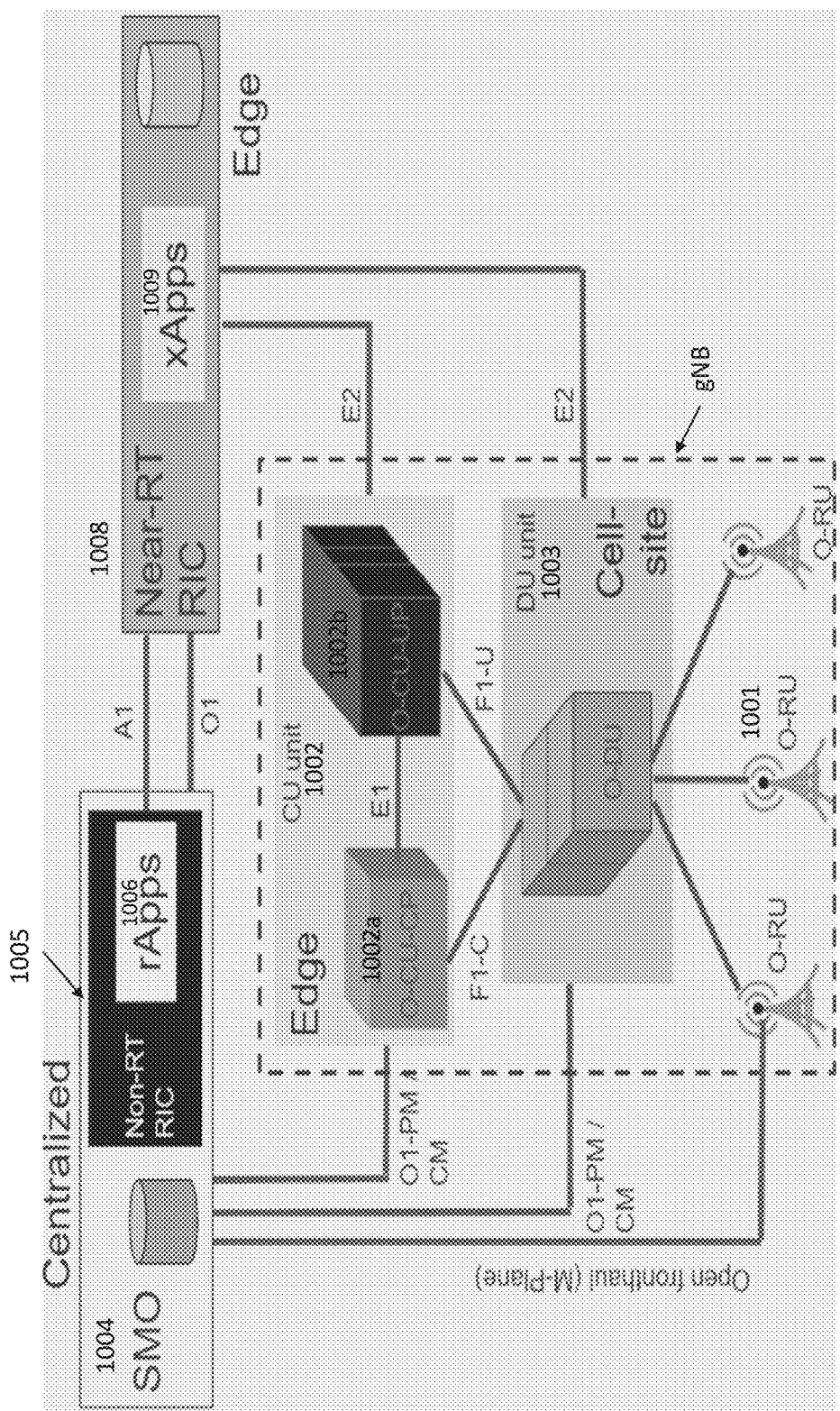
FIG. 1 is a schematic diagram of the O-RAN architecture including various O-RAN nodes and the RIC components.

A summary of the O-RAN architecture is provided below in connection with FIG. 1, which shows various O-RAN nodes and the RIC components. A gNB has a baseband unit (BBU) that processes the functions of the RAN protocol stack and one or more Radio Units (RU), e.g., O-RU 1001 shown in FIG. 1, that are used for transmission of data and signals. The baseband unit can either be monolithic or disaggregated. In a disaggregated gNB, the baseband unit is logically split into a Centralized Unit (CU) node, 1002, and one or more distributed unit (DU) nodes, 1003. The CU node 1002 can be further logically split into a Centralized Unit-Control Plane (CU-CP) function, e.g., O-CU-CP 1002*a*, and one or more Centralized Unit-User Plane (CU-UP) functions, e.g., O-CU-UP 1002*b*. In the example architecture shown in FIG. 1, the O-CU-CP, the O-CU-UP and the O-DU nodes of a gNB (or an O-eNB) are collectively referred to as E2 nodes. The E2 nodes support all radio protocol layers (e.g., RRC, SDAP, PDCP, RLC, MAC, and PHY) and interfaces (e.g., NG, S1, X2, Xn, F1, and E1, etc.) defined within 3GPP radio access networks that include eNB for E-UTRAN, and gNB/ng-eNB for NG-RAN.

The O-CU-CP, O-CU-UP and O-DU nodes (or the O-gNB, in the case of O-RAN compliant monolithic gNB) communicate with the Service Management and Orchestration (SMO) framework (shown as module 1004 in FIG. 1), which is responsible for Management plane functions (Operations, Administration and Management—OA&M) for the RAN, over the O-RAN-standardized O1 interface, while the O-RU communicates with the SMO over M-plane open front-haul interface.

One of the RIC components, i.e., the non-RT RIC 1005 shown in FIG. 1, is deployed inside the SMO 1004, which access data reports from the O-RAN nodes received over the O1 interface and uses RIC applications (called rApps, 1006) that train and develop machine learning (ML) models offline over the O1-reported data, based on which, declarative policies and enrichment information are generated, which are sent to the near-RT RIC 1008 over the O-RAN-standardized A1 interface. The E2 nodes (i.e., O-CU-CP, O-CU-UP and O-DU nodes) also interface with another RIC component, the near-RT RIC 1008, over the O-RAN standardized E2 interface. The E2 data is generated at near-RT granularities (i.e., in the order of 10 ms to 1 sec). The near-RT RIC 1008, which includes xApps 1009, then uses the declarative policies received over the A1 interface and the fine-grained E2 data for generating per-UE control decisions and imperative policies for radio resource management on a per-UE basis across the layers of the RAN protocol stack. These decisions can be based on online, hybrid machine learning, and/or reinforcement learning-based algorithms, and the decisions are sent as control actions back from the near-RT RIC 1008 to the E2 nodes (i.e., O-CU-CP 1002*a*, O-CU-UP 1002*b* and O-DU 1003) over the E2 interface.

The near-RT RIC 1008 is a logical function in the O-RAN architecture that enables near-real-time control and optimization of RAN elements, resources, and functions of the E2 nodes via fine-grained data collection and actions over the E2 interface with control loops in the order of 10 ms-1 s. A near-RT RIC can be connected to multiple E2 nodes. The E2 interface termination function in the near-RT RIC terminates the E2 interface from an E2 node. The near-RT RIC can host one or more xApps (i.e., third-party micro-services for radio resource management) that use the E2 interface to collect near-real-time information on a per-UE basis or on a per-cell basis, and provide value-added services by controlling the RAN functionalities managed by the procedures of the E2 node on a per-UE basis. The set of procedures associated with the E2 interface constitute the E2 Application Protocol (E2AP), which enables a direct association between the xApp and the RAN functionality over E2 interface. The E2 termination function routes xApp-related messages to the target xApp. Individual xApps in the Near-RT RIC can address specific RAN functions in a specific E2 Node.

The near-RT RIC 1008 and the hosted xApps 1009 can use a set of services exposed by the E2 node, described by a series of RAN function-specific "E2 Service Models (E2SM)". These services provide the near-RT RIC with access to messages and measurements exposed from the E2 node (e.g., cell configuration information, supported slices, Public Land Mobile Network (PLMN) Identity, network measurements, UE Context Information, etc.), and enable control of the E2 node from the RIC. The E2SM describes the functions in the E2 node which can be controlled by the near-RT RIC 1008 and the related procedures, thus defining a function-specific radio resource management (RRM) split between the E2 node and the near-RT RIC 1008. The RRM functional allocation between the near-RT RIC and the E2 node is subject to the capability of the E2 node exposed over the E2 interface by means of the E2 service model, to support the O-RAN use-cases. In addition to control, the near-RT RIC 1008 can monitor, suspend, stop, override, or regulate (via policies) the functions of the E2 node.

It should be noted that, in the architecture described above, one physical network element can implement multiple logical nodes, and the near-RT RIC interfaces are based on the logical model of the entity controlled using the interfaces. The near-RT RIC 1008 is connected to the non-RT RIC 1005 in the Service Management and Orchestration (SMO) framework 1004 through the A1 interface, which provides the UE-level, cell-level, slice-level, group-level declarative policies, enrichment information and ML model deployment to the near-RT RIC 1008 for RAN optimization. A near-RT RIC is connected to only one non-RT RIC. In addition, the near-RT RIC 1008 is connected to the SMO 1004 via the O1 interface. This enables forwarding network management messages from the SMO 1004 to the near-RT RIC management function.

In the following section, the principles and the services of the E2 interface will be discussed in detail. The E2 interface is open and supports the exchange of control signaling information between the endpoints (from a logical standpoint, the E2 interface is a point-to-point interface between the endpoints). The E2 interface also supports the ability to provide UE ID information, to distinctly identify individual UEs, towards the near-RT RIC based on a pre-configured trigger, which can be either periodic or event-driven. The E2 node consists of one or more RAN functions that are controlled by the near-RT RIC, which support near-RT RIC services, and other RAN functions that do not support near-RT RIC services. The E2 interface specifications facilitate the connectivity between the near-RT RIC and the E2 node supplied by different vendors.

The near-RT RIC can use the following services provided by the E2 node via its RAN functions that support RIC services: REPORT services; INSERT services; CONTROL services; and POLICY services.

REPORT services: The E2 node exposes data, such as cell configuration, supported slices, PLMNs, network measurements, UE context information, etc. to the near-RT RIC via an indication message.

INSERT services: The E2 node requests for control of RAN functionalities, associated procedures and configurable parameters to the near-RT RIC via an indication message, and the E2 node suspends the ongoing call processing until it receives a control action from the RIC, following which the E2 node resumes the suspended call processing. While initiating the request via Insert indication, the E2 node can also additionally include cell configuration information, UE context information, network measurements, etc.

CONTROL services: The E2 node enables the near-RT RIC to control selected functions of the E2 node, and the associated RAN parameters. The near-RT RIC can asynchronously send a control action to the E2 node or send the control action as a response to a previous Insert indication. In the latter case, the E2 node shall resume call processing (that it suspended following an insert indication) upon receiving the control action and triggers the appropriate procedures.

POLICY services: The E2 node enables the near-RT RIC to offer a prescriptive guidance to the E2 node on controlling the RAN functions and the values of the associated RAN parameters on the E2 node. The near-RT RIC does not send a control action that directly controls the call processing procedures in the E2 node, but offers a guidance to the control logic of the E2 node on how to process the ongoing call based on changes in the network conditions, traffic conditions, UE context, UE and network performance, etc. Such policies are generated and sent asynchronously from the near-RT RIC.

The RIC services are realized using the following E2AP procedures: E2AP RIC Subscription procedure; RIC Indication procedure; and RIC Control procedure.

E2AP RIC Subscription procedure: The near-RT RIC uses this procedure to subscribe to the RIC services provided by the E2 node. The RIC defines the trigger conditions for the subscription of these services, which include both event-driven triggers as well as periodic triggers. The event-driven triggers are defined by a set of condition tests involving associated RAN parameters, their values, and the matching conditions. The periodic triggers are based on pre-defined timer events. The subscription procedure is also used to specify the subsequent actions that must be executed by the E2 node, upon the satisfaction of the trigger conditions. These actions can include the following: Insert Indication; Report Indication; and Policy action. Each of these actions are described in detail below.

Insert Indication: the E2 node sends an indication message to the near-RT RIC containing a request to the RIC to control one or more RAN functionalities, along with one or more associated RAN parameters pertaining to a UE. Note that, as discussed above, an Insert indication requires the E2 node to suspend the ongoing call processing. For example, when the RSRP of the UE with respect to the current serving cell is less than a pre-defined threshold, the E2 node must request the near-RT RIC if the UE must be handed over to a target cell, and if so, what should be the target primary cell. Up until the E2 node hears from the RIC or until a timeout event, the E2 node suspends the ongoing call processing for the UE. Here, the "trigger" is defined by the event involving the UE's RSRP parameter, its value and the associated matching condition, the "Indication" contains the request coming from the E2 node to the near-RT RIC for handover control of the UE, and the "control parameters" requested by the E2 node is the "target primary cell" for the UE if the RIC decides to do a handover of the UE.

Report Indication: the E2 node sends an indication message to the near-RT RIC containing measurement reports, cell configuration reports, UE context reports, state information, etc. As discussed above, a Report indication does not require suspension of the ongoing call processing at the E2 node, since it is not expecting a response from the RIC to proceed, but just sends reports reflecting updates in the UE state, RAN state, etc. For example, when there is a modification in the secondary cells configured for a UE following a secondary cell re-selection, the E2 node sends the modified UE context from the E2 node to the near-RT RIC. Here, the "trigger" is defined by the event involving secondary cell reselection/modification for the UE, the "Indication" contains the updated UE context with new secondary cells, which constitute the associated RAN parameters reported by the E2 node. Another example is periodic reporting of a UE throughput by the E2 node to the near-RT RIC. Here, periodic reporting is specified by a timer event defined in the order of near-RT granularities (i.e., tens of milli-seconds to 1 second), e.g., 50 ms. The "Indication" contains the UE performance measurement reports, and the associated RAN parameters include the UE's data radio bearer throughput.

Policy action: The E2 node must execute a control action based on the trigger condition and the recommended guidance defined by the near-RT RIC. The E2 node does not raise a request to the near-RT RIC when the trigger condition is satisfied (unlike Insert indication), but inherently invokes a control action based on the recommended guidance from the near-RT RIC, as defined in the RIC subscription procedure that would need to be executed in the E2 node, a priori. For example, the policy from the near-RT RIC to the E2 node can be defined such that, during the occurrence of an A3 event for a UE (characterized by a neighbor cell yielding more RSRP to the UE than its current serving cell), the E2 node must handover the UE along with its DRBs where the list of DRBs to be admitted by the target primary cell for the UE should be sorted in decreasing order of their ARP values. Here, the "trigger" is defined by the A3 event, the "policy action" is defined by the priority of the DRBs for the UE to be handed over to the target primary cell based on the decreasing order of their ARP values, and the "RAN parameters" include the list of DRBs and their 5G QoS Identifier (5QI) profiles.

The other two E2AP procedures are RIC Indication procedure and RIC Control procedure. The RIC Indication procedure is used by the E2 node to carry the outcome and messages for the RIC indication services of INSERT and REPORT. The RIC Control procedure is used by the near-RT RIC to initiate or modify the RIC CONTROL service.

Each RAN function supporting the RIC services is described in the following terms: RAN Function Definition approach; RIC Event Trigger Definition approach; RIC Action Definition approach; RIC Indication Header and RIC Indication message approach; RIC Control Header and RIC Control message approach; and RAN Function policies. Each of these are described in detail below.

RAN Function Definition approach: Defines the RAN function name and describes the RIC services and the associated RAN parameters that the specific RAN function is currently configured to present over the E2 interface. The E2 node exchanges this information with the near-RT RIC.

RIC Event Trigger Definition approach: Describes the approach to be used in Near-RT RIC Subscription messages to set Near-RT RIC Event Trigger Definition in the RAN Function. The near-RT RIC defines the triggers, which can be either events or periodic timers, in the RIC Subscription.

RIC Action Definition approach: Describes the approach to be used in subsequent Near-RT RIC Subscription messages to set the required sequence of Near-RT RIC actions in the RAN Function. The near-RT RIC also includes the set of associated RAN parameters that must constitute each action.

RIC Indication Header and RIC Indication message approach: Describes the approach to be used by the RAN when composing Indication messages for Near-RT RIC REPORT and INSERT services. The E2 node includes the set of associated RAN parameters for each Indication message.

RIC Control Header and RIC Control message approach: Describes the approach to be used by Near-RT RIC when composing CONTROL messages. The near-RT RIC includes the set of associated RAN parameters for each control message.

RAN Function policies: Describes the set of policies that the RAN function is configured to support and the corresponding parameters that can be used to configure the policy using near-RT RIC policy services. The near-RT RIC includes the set of associated RAN parameters that are part of the policy definition in the RIC subscription.

According to an example method of the present disclosure, the following features are provided: a) a generic encoding mechanism for the message structures containing RAN parameters; b) categorization of each RAN parameter as ELEMENT, STRUCTURE or LIST; c) distinguishing of RAN parameters between a first type (parameters whose values are directly controlled by the RIC) and a second type (parameters whose values serve as indices for the E2 node to further point to other RAN parameters bound to an entity); and d) recursive encoding structure that enables controlling of any RAN parameter within any hierarchical level of nesting in 3GPP-defined parameter structures. More specifically, the example method of the present disclosure enables exchange of any RAN parameter (in any level of nesting within hierarchical structures) between the E2 node and the near-RT RIC, which exchanged RAN parameter can be controlled from the near-RT RIC. The example method is compliant with the O-RAN standards for the E2SM-RC service model, which means E2SM-RC can be used to address the requirements for a variety of O-RAN use-cases, e.g., Traffic Steering, Quality of Service (QoS) and/or Quality of Experience (QoE), MIMO Beamforming, Slicing, etc., using the disclosed generic encoding technique, thereby serving as a one-size-fits-all tool.

An example scenario is described herein to assist in illustrating the example method. Let's assume that the near-RT RIC wants to control the connected mode mobility of a UE by (a) modifying the 5G NR primary cell of the UE, (ii) reselecting the secondary cells of the UE, (iii) selecting the list of PDU sessions for handover in the case of Xn or inter-RAT or NG handover, and (iv) selecting the list of DRBs for handover in the case of intra-CU F1 handover. Given the above-described scenario, the example method of generic encoding will be described in detail below.

Generic encoding, as described herein, relies on the principle of re-using a common message structure for all RAN functionalities that can be controlled by the RIC. For example, a common message structure is provided for multiple functionalities, e.g., the following:

(a) Connected Mode Mobility functionality, for controlling the handover, conditional handover, DAPS handover, etc., for modifying the target primary cell, the list of candidate primary cells, the list of secondary cells, the list of PDU sessions for handover, the list of DRBs for handover, etc.

(b) Radio bearer control functionality, for controlling the DRB QoS configuration, QoS flow (re-)mapping configuration, radio bearer admission control, DRB termination control, logical channel configuration, etc.

(c) Dual Connectivity Control functionality, for controlling the secondary node addition, modification, PSCell (primary cell of the secondary cell group) change, secondary node change, etc.

Apart from controlling multiple RAN functionalities, the generic encoding is extended to control functionalities for multiple O-RAN use-cases.

The RAN parameters that can be controlled by the near-RT RIC for the individual functionalities can be listed with identifiers, but the identifiers are not listed or enumerated under each message structure. In the example generic encoding method, a common encoding structure is followed to accommodate all RAN parameters within the common message structure used for all control messages from the RIC to control the desired functionalities. The common encoding structure will have IEs that accommodate the RAN parameters.

In the example generic encoding method, encoding spaces are not required to be freshly defined for all the RAN parameters. Those encoding spaces for parameters defined in 3GPP technical specifications are effectively reused in generic encoding. Hence, the "presence" field, range and data type of parameter, along with their reference and semantics description, are not freshly defined in the example generic encoding method. However, encoding spaces are required for the IEs in the common encoding structures.

Some of the advantages of the generic encoding method according to the present disclosure are summarized here.

1) The common messaging structure accommodates all E2AP messages pertaining to a given service without the need to define individual message structures for each functionality.
2) The generic encoding structure encodes all the associated RAN parameters that can be controlled or configured by the near-RT RIC.
3) The encoding spaces are defined only for the IEs that constitute the generic encoding structure and not for the RAN parameters already defined in 3GPP, thereby avoiding redefining the encoding spaces already defined in 3GPP.
4) The encoding spaces can additionally be defined for the configurable RAN parameters that are not already defined in 3GPP.
5) There is no need to categorize a configurable RAN parameter as mandatory or optional or conditional. This is because the E2 node and the near-RT RIC can exchange any configurable RAN parameters with each other, with the E2 node requesting for any RAN parameter to be controlled by the RIC, and the RIC choosing to control any functionality and any associated RAN parameter.

According to an example method, a common message structure is provided for leveraging generic encoding for the RIC Control Message IE in E2AP: RIC Control Request message for the control service, and RIC Indication Message IE in E2AP: RIC Indication Message for the Insert service. RIC Control Request message is sent by the near-RT RIC to an E2 node to initiate or resume a control function logic. The IE contents of the RIC Control Request message are as follows:

| IE/Group Name |
| --- |
| Message Type |
| RIC Request ID |
| RAN Function ID |
| RIC Call Process ID |
| RIC Control Header |
| RIC Control Message |
| RIC Control Ack Request |

RIC Indication message is sent by the E2 node to the near-RT RIC to transfer report information or to raise a request for a control function logic in the E2 node to the near-RT RIC. The IE contents of the RIC Indication message are as follows:

| IE/Group Name |
| --- |
| Message Type |
| RIC Request ID |
| RAN Function ID |
| RIC Action ID |
| RIC Indication SN |
| RIC Indication Type |
| RIC Indication Header |
| RIC Indication Message |
| RIC Call process ID |

In addition to the above, the example generic encoding mechanism according to the present disclosure can be used to establish condition tests for RAN parameters against specified values, typically used in event trigger subscriptions and policy conditions.

According to the example generic encoding mechanism, a method is provided to categorize RAN parameters exchanged via E2 messages between the E2 nodes and the near-RT RIC into three types, in which method each RAN parameter is associated with any of the following categories:

ELEMENT: A singleton variable, which does not have any other associated RAN parameters.

STRUCTURE: A sequence of RAN parameters, each of which can be either an ELEMENT or another STRUCTURE (that can further contain a sequence of RAN parameters) or a LIST LIST: A list of STRUCTURES, where each STRUCTURE is as defined above. The sequence of RAN parameters is the same across all STRUCTURES within the list.

As an example, let us consider the set of configurable RAN parameters for the connected mode mobility RAN functionality for controlling the handover of a UE. The list of associated RAN parameters includes the following:

1) Target cell global ID of the UE;
2) List of PDU sessions of the UE for handover;
3) List of DRBs of the UE for handover; and
4) List of secondary cells to be reselected for the UE.

FIG. 2 shows the full listing of the RAN parameters and the associated categories for the example. The illustrated categorization enables any RAN parameter under any level of hierarchically-nested parameter structures to be exchanged via E2AP messages using a generic encoding scheme and a common message structure for each individual RIC service. The encoding mechanism is detailed in a subsequent section. The near-RT RIC controls the values of the RAN parameters categorized as ELEMENT and encodes them under the appropriate nested structures (if any) using the generic encoding mechanism.

Apart from the categorization of RAN parameters discussed in connection with FIG. 2, the example method also distinguishes RAN parameters of type ELEMENT between a first type (parameters whose values are directly controlled by the RIC; also referred to as "non-key parameters") and a second type (parameters whose values serve as indices for the E2 node to further point to other RAN parameters bound to an entity; also referred to as "key parameters"). These two types of parameters are discussed in detail below.

Key parameters: These parameters serve as indices, referring to an entire STRUCTURE consisting of other parameters. The itemized STRUCTURES within a LIST all have a constituent RAN parameter that serves as an index to each of the itemized STRUCTURES. For example, the RAN parameter Data Radio Bearer (DRB) Identity serves as a key to an entire DRB, which is an itemized STRUCTURE, within the list of DRBs of the UE considered for handover. They are controllable in the sense that the near-RT RIC can use them for selecting which DRBs of the UE should be considered for handover. Similarly, the PDU Session ID is another key parameter which the near-RT RIC uses to control which PDU sessions of the UE should be subject to handover. Likewise, which QoS flows of the UE, where the QoS flows are indexed by the QoS Flow Index (QFI), should be mapped to a given DRB, can be controlled by the RIC by referring to the QFIs of those flows. In general terms, the near-RT RIC can indicate the values of the RAN parameters, identified as key indices, to refer to other parameters in associated structures, for purposes such as filtering the selection of items (itemized structures) within a list.

Non-key parameters: These parameters are the regular RAN parameters whose values can be directly controlled (e.g., set or modified) by the near-RT RIC. The non-key parameters do not necessarily point to other parameters and are not necessarily associated with structures. For example, the 5G NR Cell Global Identifier (NCGI) for the target cell of the UE for handover can be set by the near-RT RIC to control the connected mode mobility RAN functionality for the UE, and this parameter does not serve as an index to other parameters associated with any structures.

For the purpose of distinguishing RAN parameter ELEMENT between these two types, a Boolean key flag is associated with every RAN parameter, and set to TRUE if the RAN parameter is indeed a key parameter, or set to FALSE if otherwise. FIG. 3 illustrates the example list of RAN parameters, along with associated category and the Boolean key flag.

The following sections describe an example common message structure using the generic encoding scheme, including how the key flag attribute is encoded along with the RAN parameters in the common message structure using the generic encoding scheme.

The common message structure for RIC Control Message IE of the RIC Control Request message is as follows:

| IE/Group Name | Presence | Range | IE type and reference | Semantics description |
|---|---|---|---|---|
| List of RAN parameters | | 0 ... <maxnoofAssociatedRANParameters> | | |
| >RAN Parameter ID | M | | | |
| >RAN Parameter Value Type | M | | 3.3.1.1 | |

In this example, maxnoofAssociatedRANParameters can be a constant value.

RAN Parameter Value Type specifies the RAN parameters controlled by the RIC. The parameters can be individual elements, or structures containing constituent elements or a list of structures. FIG. 4 is a table showing the generic encoding of RAN parameters based on their categorization of the RAN parameters into ELEMENT, STRUCTURE and LIST categories, and how the RAN Parameter ELEMENT can be associated with a Boolean Key Flag to distinguish key parameters from non-key parameters. A recursive encoding structure is provided, in which:

a. The RAN Parameter Value Type can be an ELEMENT, or a STRUCTURE, or a LIST, indicating the categorization, as shown in FIG. 4.

b. RAN Parameter STRUCTURE can, in turn, point to a sequence of RAN parameters, as shown in the subsequent sections, each of which has a RAN Parameter Value Type as shown in the table above.

c. RAN Parameter LIST can be a list of STRUCTURES, each of which is referred back to the STRUCTURE defined in the subsequent sections, which, in turn, is a sequence of RAN Parameters, each of which has a Value Type as shown in the table above.

This principle of recursion used for generic encoding thus enables encoding any RAN parameter under any level of nesting in hierarchical structures to be exchanged using the common message structure for E2AP messages between the near-RT RIC and the E2 node.

RAN Parameter STRUCTURE can be configured as follows:

| IE/Group Name | Presence | Range | IE type and reference | Semantics description |
|---|---|---|---|---|
| Sequence of RAN Parameters | | <1 ... maxNoOfParametersInStructure> | | |
| >RAN Parameter ID | M | | INTEGER | |
| >RAN Parameter Value Type | M | | 3.3.1.1 | Each parameter in the structure can in turn be an individual ELEMENT or another STRUCTURE or a LIST |

Here, maxNoOfParametersInStructure can be a constant value.

| RAN Parameter List can be configured as follows: | | | | |
|---|---|---|---|---|
| IE/Group Name | Presence | Range | IE type and reference | Semantics description |
| List of RAN Parameter Structures | | <1 ... maxNoOfItemsInList> | | |
| >RAN Parameter ID | M | | INTEGER | |
| >RAN Parameter Structure | M | | 3.3.1.2 | |

Here, maxNoOfItemsInList can be a constant value.

RIC Indication Message IE specifies the RAN parameters requested by the E2 node. The parameters requested can be individual elements, or structures containing constituent elements or a list of structures. The below tables show the generic encoding of RAN parameters based on their categorization of the RAN parameters into ELEMENT, STRUCTURE and LIST categories, and how the RAN Parameter ELEMENT can be associated with a Key Flag Boolean flag to distinguish key parameters from non-key parameters. In the case of ELEMENTS, the E2 node can indicate their parameter IDs in the INSERT Indication message to the near-RT RIC and request the RIC to assign the value for the parameter. If the RAN parameter is a STRUCTURE, then the E2 node can request the RIC to fill the value of the constituent parameters of the STRUCTURE; otherwise, if the E2 node wants the RIC to fill only the values of specific constituent parameters of the STRUCTURE, it can indicate the RAN parameter ID for the corresponding parameters. Similarly, the E2 node can request the RIC to fill the values of all the constituent itemized STRUCTURES of an entire LIST. If the E2 node wants to request the RIC to fill the values of the parameters associated with a given itemized STRUCTURE within the LIST, then the E2 node indicates the key parameter and its value, which serves as an index to the STRUCTURE, in order to enable the near-RT RIC to know which STRUCTURE entity within the LIST is being referred to by the E2 node. If the E2 node wants the RIC to control the value of a non-key RAN parameter ELEMENT, it simply indicates the RAN parameter ID of the corresponding RAN parameter to the near-RT RIC.

Put together, the common message structure for the INSERT Indication message that leverages the generic and recursive encoding of RAN parameters is given as follows:

| RAN Parameter Value Type | | | | |
|---|---|---|---|---|
| IE/Group Name | Presence | Range | IE type and reference | Semantics description |
| CHOICE RAN Parameter Value Type | M | | | A RAN Parameter can either be an ELEMENT or a STRUCTURE or a LIST |
| >ELEMENT | | | | If the RAN parameter is singular variable |
| >>Key Flag | O | | BOOLEAN | Whether the parameter is a key, indexing other parameters in a structure or not. |
| >>RAN Parameter Value | O | | ENUMERATED (INTEGER, REAL, OCTET STRING, PrintableString, ...) | if the RAN Parameter is a key parameter, then the value is given; else the value is not given. |
| >STRUCTURE | | | | If the RAN parameter is a structure, in turn containing a set of RAN parameters |
| >>RAN Parameter Structure | M | | 3.3.2.2 | |
| >LIST | | | | If the RAN parameter is a list containing individual items, each of which has an index |
| >>RAN Parameter List | M | | 3.3.2.3 | |

| RAN Parameter Structure | | | | |
|---|---|---|---|---|
| IE/Group Name | Presence | Range | IE type and reference | Semantics description |
| Sequence of RAN Parameters | | <0 ... maxNoOfParametersInStructure> | | |
| >RAN Parameter ID | M | | INTEGER | |

| RAN Parameter Structure | | | | |
|---|---|---|---|---|
| IE/Group Name | Presence | Range | IE type and reference | Semantics description |
| >RAN Parameter Value Type | M | | 3.3.2.1 | Each parameter in the structure can in turn be an individual ELEMENT or another STRUCTURE or a LIST |

Here, maxNoOfParametersInStructure can be a constant value.

| RAN Parameter List | | | | |
|---|---|---|---|---|
| IE/Group Name | Presence | Range | IE type and reference | Semantics description |
| List of RAN Parameter Structures | | <0 ... maxNoOfItemsInList> | | |
| >RAN Parameter ID | M | | INTEGER | |
| >RAN Parameter Structure | M | | 3.3.2.2 | |

Here, maxNoOfItemsInList can be a constant value.

FIG. 5 shows an example of the contents of the RIC Control Header IE and the RIC Control Message IE by illustrating a control action for the Connected Mode Mobility service sent from the RIC to the E2 node to handover a UE "abc" to NR CGI with PLMN Identity "xyz" and NR Cell Identity "123", along with two DRBs with IDs 10 and 20, respectively.

The above-described example embodiments provide a mechanism for generic encoding of all RAN parameters exchanged over E2AP between the O-RAN nodes and the near-RT RIC, which mechanism provides, among others, the following advantages:

1. A common message structure is used to exchange any number of RAN parameters over E2AP messages between the E2 node and the near-RT RIC.

2. Using the common message structure and generic encoding, any RAN parameter within any level of nesting in hierarchical structures can be recursively encoded in the common message structure for E2AP messages between the E2 node and the near-RT RIC.

3. The disclosed method avoids the need to define individual message structures and enumerate RAN parameters for each message structure for controlling each corresponding RAN functionality.

4. The E2SM RAN Control can be used as a generic service model for controlling a variety of RAN functionalities corresponding to a plethora of O-RAN use-cases.

5. The mechanism is critical to both standardization and commercialization of near-RT RIC.

Glossary of Terms

3GPP: 3rd Generation Partnership Project
BS: Base Station
DL: Downlink
eCPRI: Enhanced Common Public Radio Interface
eNB: eNodeB (4G LTE base station)
FH: Fronthaul
gNB: gNodeB (5G NR base station)
M-plane: Management plane
MIMO: Multiple Input Multiple Output
Massive MIMO: Massive Multiple Input Multiple Output
NR: new radio interface and radio access technology for cellular networks
KPIs: Key performance indicators
O-CU: O-RAN compliant Centralized Unit
O-DU: O-RAN compliant Distributed Unit
O-RU: O-RAN compliant Radio Unit
PRACH: Physical random-access channel
PRB: Physical resource block
PTP: Precision time protocol
PPP: Poisson point process
RRC: Radio Resource Controller
RIC: RAN Intelligent Controller
TRP: Transmission/Reception Point
RACH: Random access channel
RAT: Radio access technology
RE: Resource element
RoE: Radio over Ethernet
RSRP: Reference Signal Received Power
SMO: Service Management and Orchestration
SS: Synchronization Signal
SSB: Synchronization Signal Block
SyncE: Synchronous Ethernet
SNR: Signal to Noise Ratio
TCH: Traffic channel
UL: Uplink
UE: User Equipment
PSS: Primary Synchronization Signal
SSS: Secondary Synchronization Signal
PBCH: Physical Broadcast Channel
DMRS: Demodulation Reference Signal
OFDM: Orthogonal Frequency Division Multiplexing
CM: Configuration Management
CU: Centralized Unit
DU: Distributed Unite
E-RAB: E-UTRAN-Radio Access Bearer
E-UTRAN: Evolved-Universal Terrestrial Radio Access Network.
IE: Information Element
MEI: International Mobile Equipment Identity
IMSI: International Mobile Subscriber Identity
MAC: Medium Access Control
ML: Machine Learning
MME: Mobility Management Entity O-MeNB: Open RAN-compatible Master Evolved Node B
NG-Core: Next Generation Core
NG-RAN: Next Generation-Radio Access Network
NR: New Radio
NGAP: Next Generation Application Protocol
PDCP: Packet Data Convergence Protocol
PHY: Physical Layer
QoS: Quality-of-Service
RACH: Random Access Control Channel
RLC: Radio Link Control
RNTI: Radio Network Temporary Identifier
Near-RT-RIC: Near-Real-Time RAN Intelligent Controller
non-RT RIC: Non-Real-Time RAN Intelligent Controller
SDAP: Service Data Adaptation Plane
UPF: User Plane Function
xApps: eXtensible applications
XnAP: Xn Application Protocol

What is claimed is:

1. A method of generic encoding of a radio access network (RAN) parameter exchanged over E2 application protocol (E2AP) between an Open Radio Access Network (O-RAN) node and a near-real time radio access network intelligent controller (near-RT RIC), comprising:
using a generic encoding mechanism, for a message structure containing at least one RAN parameter, providing a common message structure is provided for encoding at least one of i) RIC Control Request message for control service, and ii) RIC Indication Message for insert service, wherein the generic encoding mechanism includes a first categorization of each RAN parameter exchanged between the O-RAN node and the near-RT RIC into one of ELEMENT type, STRUCTURE type or LIST type;
wherein: the ELEMENT type parameter is a singleton variable which does not have any other associated RAN parameter;
the STRUCTURE type parameter is a sequence of RAN parameters in which each RAN parameter in the sequence can be one of the ELEMENT type parameter, another STRUCTURE type parameter, or the LIST type parameter; and
the LIST type parameter is a list of STRUCTURE type parameters, and
the generic encoding mechanism provides a recursive encoding structure enabling control of any RAN parameter, including the at least one RAN parameter, within any hierarchical level of nesting in 3GPP-defined parameter structures.

2. The method according to claim 1, wherein the sequence of RAN parameters is the same for all STRUCTURES within the LIST type parameter.

3. The method of claim 1, wherein the generic encoding mechanism includes a second categorization of each RAN parameter between i) a first type in which the value of the RAN parameter is directly controlled by the near-RT RIC, and ii) a second type in which the value of the RAN parameter serves as an index for the O-RAN node to further point to other RAN parameters.

4. The method of claim 3, wherein: the method enables exchange of any RAN parameter between the O-RAN node and the near-RT RIC; and the exchanged RAN parameter is controlled from the near-RT RIC.

5. The method of claim 4, wherein the method is compliant with O-RAN standards for E2 Service Model-RAN Control (E2SM-RC) service model.

6. The method of claim 5, wherein the E2SM-RC service model is used for at least one of the following O-RAN functionalities: traffic steering; quality of service (QOS); quality of experience (QoE); multiple input multiple output (MIMO) beamforming; and slicing.

7. The method of claim 3, wherein: for the purpose of distinguishing the ELEMENT type RAN parameter between the first type and the second type, a Boolean key flag is associated with every ELEMENT type RAN parameter and set to i) TRUE if the RAN parameter is of the second type, or ii) set to FALSE if the RAN parameter is of the first type.

8. The method of claim 1, wherein the generic encoding mechanism provides a recursive encoding structure enabling control of any RAN parameter within any hierarchical level of nesting in 3GPP-defined parameter structures.

9. The method of claim 8, wherein: the method enables exchange of any RAN parameter between the O-RAN node and the near-RT RIC; and the exchanged RAN parameter is controlled from the near-RT RIC.

10. The method of claim 9, wherein the method is compliant with O-RAN standards for E2 Service Model-RAN Control (E2SM-RC) service model.

11. The method of claim 10, wherein the E2SM-RC service model is used for at least one of the following O-RAN functionalities:
traffic steering; quality of service (QOS); quality of experience (QoE);
multiple input multiple output (MIMO) beamforming; and slicing.

12. The method of claim 9, wherein the generic encoding mechanism includes a second categorization of each RAN parameter between i) a first type in which the value of the RAN parameter is directly controlled by the near-RT RIC, and ii) a second type in which the value of the RAN parameter serves as an index for the O-RAN node to further point to other RAN parameters.

13. The method of claim 12, wherein: for the purpose of distinguishing the ELEMENT type RAN parameter between the first type and the second type, a Boolean key flag is associated with every ELEMENT type RAN parameter and set to i) TRUE if the RAN parameter is of the second type, or ii) set to FALSE if the RAN parameter is of the first type.

* * * * *